(12) United States Patent
Simon

(10) Patent No.: US 7,614,267 B2
(45) Date of Patent: *Nov. 10, 2009

(54) CONTROL PEDAL DISABLING DEVICE

(76) Inventor: David Simon, 39016 Lake Shore Dr., Harrison Township, MI (US) 48045

( * ) Notice: Subject to any disclaimer, the term of this patent is extended or adjusted under 35 U.S.C. 154(b) by 0 days.

This patent is subject to a terminal disclaimer.

(21) Appl. No.: 11/774,209

(22) Filed: Jul. 6, 2007

(65) Prior Publication Data

US 2008/0053171 A1 Mar. 6, 2008

Related U.S. Application Data

(63) Continuation of application No. 11/098,774, filed on Apr. 4, 2005, now Pat. No. 7,251,969.

(60) Provisional application No. 60/559,079, filed on Apr. 2, 2004.

(51) Int. Cl.
*F16H 57/00* (2006.01)
(52) U.S. Cl. .......................................... 70/202; 70/237
(58) Field of Classification Search ........... 70/198–205, 70/237, 238, 254
See application file for complete search history.

(56) References Cited

U.S. PATENT DOCUMENTS

| 5,220,707 | A | 6/1993 | Newman, Sr. et al. | |
| 5,906,121 | A | 5/1999 | Mankarious | |
| 5,911,765 | A | 6/1999 | DaSilva | |
| 6,439,012 | B1 | 8/2002 | Chen | |
| 6,575,001 | B1 | 6/2003 | Simon et al. | |
| 6,792,780 | B1 * | 9/2004 | De Lucia | 70/202 |
| 7,251,969 | B2 * | 8/2007 | Simon | 70/202 |
| 7,412,859 | B2 * | 8/2008 | Lycoudis | 70/202 |
| 2006/0272371 | A1 * | 12/2006 | Lycoudis | 70/202 |
| 2007/0277568 | A1 * | 12/2007 | Lycoudis | 70/202 |

* cited by examiner

*Primary Examiner*—Suzanne D Barrett
(74) *Attorney, Agent, or Firm*—Carlson, Gaskey & Olds

(57) ABSTRACT

A control pedal disabling device includes a housing having a side opening or notch for receiving a pedal assembly component. The opening has a forward surface for bearing against the underside of a pedal assembly component. A rod is slidably mounted to the housing. The rod is movable across the opening to trap the pedal assembly component in the opening. The rod is also movable forwardly from the housing to bear against a vehicle floor, thereby preventing movement of the pedal assembly component toward the vehicle floor.

20 Claims, 1 Drawing Sheet

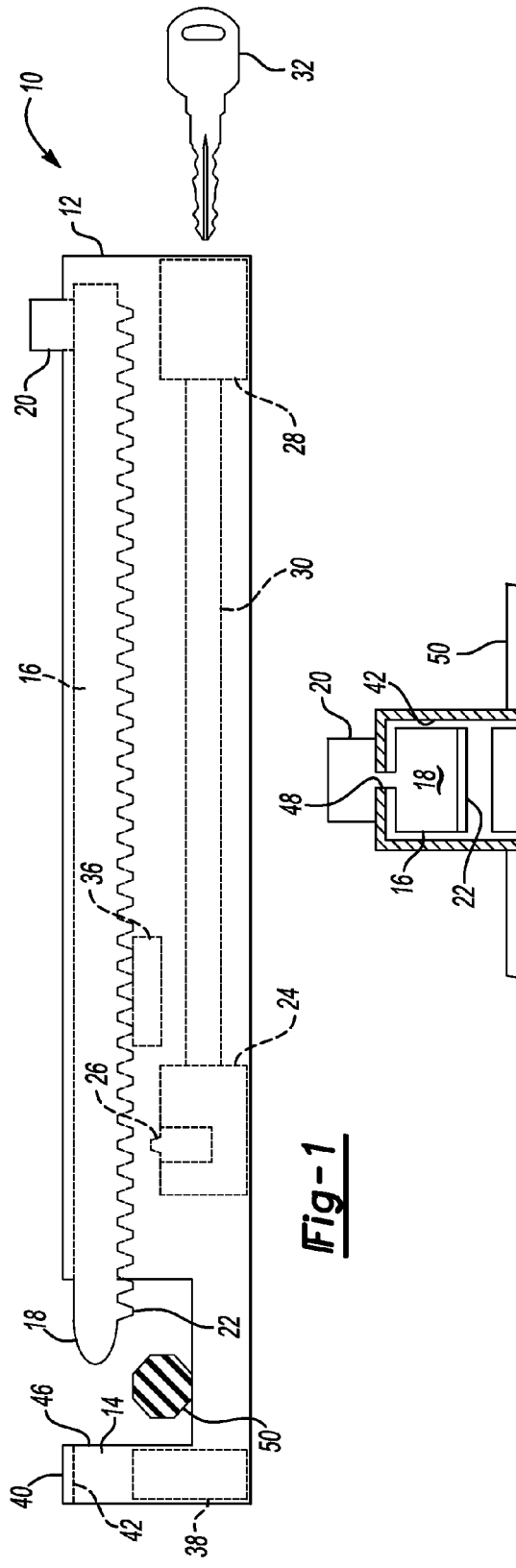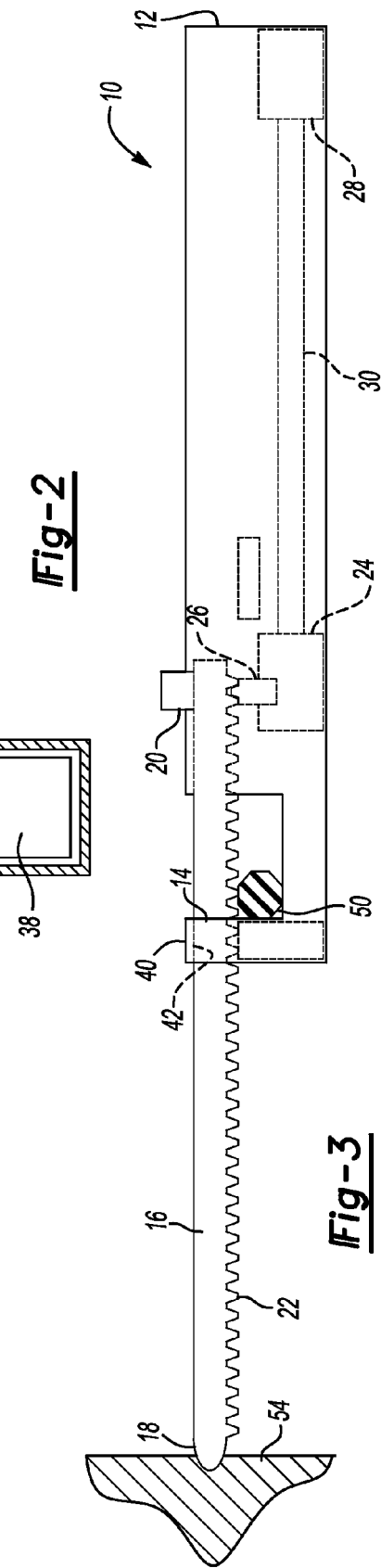

CONTROL PEDAL DISABLING DEVICE

This application is a continuation application of U.S. application Ser. No. 11/098,774, filed on Apr. 4, 2005 now U.S. Pat. No. 7,251,969, which claims priority to U.S. Provisional Application No. 60/559,079, filed Apr. 2, 2004.

BACKGROUND OF THE INVENTION

The present invention relates generally to a vehicle theft deterrent, and more particularly to a device for selectively disabling a vehicle control pedal to prevent theft of the vehicle.

Control pedal disabling devices permit a vehicle owner to selectively disable one or more vehicle control pedals while the vehicle is unoccupied to prevent theft of the vehicle. Because vehicles are now typically equipped with brake-shift-interlocks, which prevent shifting the vehicle transmission out of park unless the brake is depressed, brake locks are a useful deterrent to vehicle theft. Existing brake locks are described in U.S. Pat. Nos. 6,575,001, 6,463,772 and 6,202,456, for example. These devices are complex, have numerous parts and are consequently expensive. Some of these designs also have a substantial risk of pinching the users hand or fingers between its serrated rod and housing.

SUMMARY OF THE INVENTION

A control pedal disabling device includes a housing having a side opening or notch for receiving a pedal assembly component. The opening has a forward surface for bearing against the underside of a pedal assembly component. A rod is slidably mounted to the housing.

In the retracted position, a forward end of the rod is rearward of the at least a portion of the side opening, thereby permitting the insertion and removal of the pedal assembly component. The rod is movable across the opening and forward of the forward surface of the opening to trap the pedal assembly component in the opening. The rod is further movable through an opening in the forward surface of the opening and forwardly from the housing to bear against a vehicle floor, thereby preventing movement of the pedal assembly component toward the vehicle floor.

BRIEF DESCRIPTION OF THE DRAWINGS

Other advantages of the present invention can be understood by reference to the following detailed description when considered in connection with the accompanying drawings wherein:

FIG. 1 is a schematic view of a control pedal disabling device according to a first embodiment of the present invention, shown in the unlocked retracted position.

FIG. 2 is an enlarged end view of the control pedal disabling device of FIG. 1.

FIG. 3 is the control pedal disabling device of FIG. 1 in the locked, extended position.

DETAILED DESCRIPTION OF THE PREFERRED EMBODIMENTS

A control pedal disabling device 10 according to the present invention is shown schematically in FIGS. 1-3. Referring to FIG. 1, the device 10 generally includes a housing 12, which is a tubular body with a rectangular cross-section. The housing 12 has a large opening or notch 14 cut into one side.

A rod 16 is slidable within the housing 12. The rod 16 includes a narrow or bullet-shaped forward end 18. The rod 16 further includes a handle 20 protruding through a slot in the housing 12. A rack 22 is formed on one long side of the rod 16. The rack 22 preferably includes a plurality of evenly-spaced, angled teeth (teeth are shown schematically only).

A lock assembly 24 is mounted within the housing 12 and includes a selectively retractable pin 26 that selectively engages the rack 22 on the rod 16. The lock assembly 24 is locked and unlocked by rotation of a key rod 30 coupled to a key cylinder 28 mounted at a rearward end of the housing 12. The key cylinder 28 is selectively locked or unlocked by a key 32. Because the teeth on the rod 16 are angled, the pin 26 engages the rack 22 in a ratcheting manner when locked, permitting movement of the rod 16 forwardly, while preventing movement of the rod 16 rearwardly.

One or more guides 36 (one shown) in housing 12 guide the movement of the rod 16 within the housing 12. A forward guide 38 at the forward end 40 of the housing 12 partially closes the forward end 40 of the housing 12 to define an opening 42 aligned with the rod 16.

As can be seen in FIG. 2, the rod 16 is aligned with the opening 42 in the forward end 40 of the housing 12. The handle 20 extends through a slot 48 in the housing 12 and connects to the rod 16.

In operation, the device 10 is first placed in the retracted, unlocked position as shown in FIG. 1, where the forward end 18 of the rod 16 is rearward of the forward surface 46 of the notch 14 and at least a portion of the notch 14 side opening. The notch 14 in the housing 12 is placed around an arm 50 of the control pedal (for example, the brake) of a vehicle. The device 10 is locked, either before or after placing the arm 50 into the notch 14, by rotation of the key 32 in the key cylinder 28, which rotates key rod 30 and causes lock assembly 24 to extend pin 26 into engagement with the teeth on the rack 22. The user then grasps the handle 20 to push the rod 16 forwardly, while the rack 22 ratchetingly engages the pin 26 of the lock assembly 24.

As shown in FIG. 3, as the rod 16 is pushed forwardly the forward end 18 of the rod 16 crosses the notch 14 and extends through the opening 42 in the forward end 40 of the housing 12, thereby trapping the arm 50 of the brake (or accelerator or clutch) in the notch 14 of the housing 12. The user continues to push the rod 16 forwardly until the forward end 18 of the rod 16 engages the floor or firewall 54 of the vehicle. As shown, the forward end 18 may slightly depress the carpet or other material of the floor or firewall 54. Since the device 10 is locked, the rod 16 cannot be retracted from the floor or firewall 54. The arm 50 is prevented from moving out of the notch 14 by the notch 14. The arm 50 cannot be depressed toward the floor or firewall 54 because it bears against a forward surface of the notch 14 in the housing 12. The vehicle is therefore temporarily selectively disabled by the user when unattended. When the user returns, the device 10 is unlocked and the rod 16 is retracted into the housing 12, removed from the control pedal arm 50 and stored for future use.

The control pedal disabling device 10 has several advantages over the previously known devices. First, the device 10 does not extend nearly as far above the arm 50 of the control pedal when engaged. This reduces the leverage available to an unauthorized person who tries to rotate the device 10 on the arm 50, such that the forward end 18 of the device 10 does not engage the floor or firewall 54. To further prevent this, the forward end 18 of the rod 16 is narrowed, such that it sinks in or depresses the floor or firewall 54 to prevent lateral movement of the forward end 18.

Additionally, when in the retracted position as shown in FIG. 1, the device 10 is substantially more compact than the previous designs. The device 10 is simpler, easier to manufacture, cheaper to manufacture and lighter than the previous designs. Some previous designs have a substantial risk of pinching the users hand or fingers between its serrated rod and housing. There is almost no risk of pinching in the device 10 of the present invention.

Although a preferred embodiment has been described and shown, it is recognized that variations could be made within the scope of the present invention. For example, rounded cross-sectioned housings could be used optionally with a half-round rod slidable therein.

What is claimed is:

1. A control pedal disabling device comprising:
   a housing having an opening for receiving a pedal assembly component, the opening having a forward surface for bearing against the pedal assembly component;
   a rod slidably mounted within the housing between a retracted position and a deployed position, the rod movable across the opening to trap the pedal assembly component in the opening and forwardly from the housing to bear against a vehicle floor in the deployed position, wherein a rearward-most end of the rod is within the housing when the rod is in the retracted position; and
   a lock for selectively preventing rearward movement of the rod relative to the housing.

2. The control pedal disabling device of claim 1 wherein the rod includes a forward end movable from a point rearward of the forward surface, across the opening and forward of the forward surface.

3. The control pedal disabling device of claim 2 further including an opening through the forward surface, the forward end of the rod slidable through the opening through the forward surface.

4. The control pedal disabling device of claim 3 installed in a vehicle with the pedal assembly component disposed in the opening of the housing and with the forward end of the rod bearing against the vehicle floor.

5. The control pedal disabling device of claim 1 wherein the rod is slidable parallel to a longitudinal axis of the rod and wherein the opening of the housing is a side opening that is not parallel to the longitudinal axis.

6. The control pedal disabling device of claim 5 wherein the forward surface is at least substantially perpendicular to the longitudinal axis.

7. The control pedal disabling device of claim 1 wherein the lock permits forward movement of the rod relative to the housing, but does not permit rearward movement of the rod relative to the housing when locked.

8. A method for disabling a control pedal of a vehicle including the steps of:
   a) positioning a forward surface of a housing adjacent an underside of an arm of a control pedal assembly;
   b) positioning the housing adjacent the arm;
   c) moving a forward end of a rod from a position rearward of the forward surface forwardly into contact with a floor of the vehicle, such that the rod is adjacent the arm and such that the arm is between the rod and the housing.

9. The method of claim 8 further including the step of locking the forward surface relative to the rod to prevent rearward movement of the rod.

10. The method of claim 8 wherein the rod and the forward surface trap the portion of the control pedal assembly after said step b.

11. The method of claim 8 wherein the rod is substantially perpendicular to the forward surface.

12. The method of claim 8 wherein the forward surface is on a forward portion of the housing, the rod slidably mounted to the housing.

13. The method of claim 12 wherein the forward portion includes an opening through the forward surface, the forward end of the rod slidable into and through the opening through the forward portion of the housing.

14. The method of claim 13 further including the step of locking the rod relative to the housing to prevent rearward movement of the rod.

15. The control pedal disabling device of claim 2 further including a handle secured to the rod, the handle protruding in a direction generally perpendicular to the rod through a side wall of the housing.

16. The control pedal disabling device of claim 15 wherein the housing includes a rearward-most wall, the rearward-most end of the rod forward of the rearward-most wall of the housing when the rod is in the retracted position and when the rod is in the deployed position.

17. The control pedal disabling device of claim 16 further including a key cylinder mounted to the rearward-most wall of the housing, the rod completely forward of the key cylinder when the rod is in the deployed position.

18. The method of claim 8 wherein the rod is moved from a retracted position to a deployed position in said step c), and wherein a rearward-most portion of the rod is within the housing when the rod is in the retracted position.

19. The method of claim 18 wherein the housing includes a rearward-most wall, the rod completely forward of the rearward-most wall when the rod is in the retracted position and when the rod is in the deployed position.

20. A control pedal disabling device comprising:
   a housing having a rearward-most portion and a side opening for receiving a pedal assembly component, the opening having a forward surface for bearing against the pedal assembly component;
   a rod slidably mounted within the housing between a retracted position forward of the rearward-most portion of the housing and a deployed position, the rod in the deployed position extending across the opening to trap the pedal assembly component in the opening and extending forwardly from the housing to bear against a vehicle floor; and
   a lock for selectively preventing rearward movement of the rod relative to the housing.

* * * * *